(12) United States Patent
Otsuka et al.

(10) Patent No.: US 9,938,602 B2
(45) Date of Patent: Apr. 10, 2018

(54) PRODUCTION METHOD AND PRODUCTION FACILITY OF METAL PIPE (71) Applicant: NIPPON STEEL & SUMITOMO METAL CORPORATION, Tokyo (JP)

(72) Inventors: Shunichi Otsuka, Tokyo (JP); Kazuhiro Uchida, Tokyo (JP); Takuya Hanada, Tokyo (JP); Masami Sakiyama, Tokyo (JP); Tsutomu Shima, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 718 days.

(21) Appl. No.: 14/382,803

(22) PCT Filed: Feb. 22, 2013

(86) PCT No.: PCT/JP2013/054460
§ 371 (c)(1),
(2) Date: Sep. 4, 2014

(87) PCT Pub. No.: WO2013/133042
PCT Pub. Date: Sep. 12, 2013

(65) Prior Publication Data
US 2015/0068650 A1 Mar. 12, 2015

(30) Foreign Application Priority Data
Mar. 9, 2012 (JP) .................................. 2012-052956

(51) Int. Cl.
C21D 9/08 (2006.01)
C21D 1/42 (2006.01)
B21D 3/00 (2006.01)
B23D 21/00 (2006.01)
C21D 1/18 (2006.01)
C21D 8/10 (2006.01)
C21D 9/00 (2006.01)

(52) U.S. Cl.
CPC .............. C21D 9/085 (2013.01); B21D 3/00 (2013.01); B23D 21/00 (2013.01); C21D 1/18 (2013.01);
(Continued)

(58) Field of Classification Search
CPC ... B21D 3/00; B21D 3/02; B21D 1/00; B21D 1/12; B21D 1/14; B21D 28/00;
(Continued)

(56) References Cited

U.S. PATENT DOCUMENTS 3,915,763 A * 10/1975 Jennings ................ C21D 9/085
148/520
4,158,758 A * 6/1979 Kunioka ................. C21D 1/42
148/570
(Continued)

FOREIGN PATENT DOCUMENTS

CN 1913985 2/2007
GB 403684 12/1933
(Continued)

Primary Examiner — Jonathan J Johnson
Assistant Examiner — Alexandra M Moore
(74) Attorney, Agent, or Firm — Clark & Brody (57) ABSTRACT A method of producing a metal pipe which can suppress quenching defects is provided. In the method, a bend of the metal pipe is straightened by a straightening machine 10. Next, both pipe end portions of the metal pipe whose bend has been straightened are cut off by a pipe cutting apparatus 20. Next, a plurality of the metal pipes whose both pipe end portions have been cut off are aligned in the axial direction thereof to be conveyed to a quenching apparatus 30, and the metal pipes are quenched by being cooled after being heated by induction heating.

8 Claims, 4 Drawing Sheets (52) U.S. Cl.
CPC ............. *C21D 1/42* (2013.01); *C21D 8/10* (2013.01); *C21D 9/0062* (2013.01); *C21D 9/08* (2013.01); *Y02P 10/253* (2015.11)

(58) Field of Classification Search
CPC .......... B21D 35/00; C21D 9/00; C21D 9/085; C21D 9/0062; C21D 9/08; C21D 8/00; C21D 8/10; C21D 1/00; C21D 1/10; C21D 1/18; C21D 1/42; C21D 2261/00; B23D 21/00; Y02P 10/253
See application file for complete search history.

(56) References Cited

U.S. PATENT DOCUMENTS

| | | | | |
|---|---|---|---|---|
| 4,188,243 | A * | 2/1980 | Takahashi | C21D 9/04 148/594 |
| 4,452,061 | A * | 6/1984 | Numano | C21D 9/08 72/201 |
| 4,461,462 | A * | 7/1984 | Mizushima | C21D 9/085 266/117 |
| 5,634,512 | A * | 6/1997 | Bombardelli | B22D 11/124 164/414 |
| 6,336,980 | B1 * | 1/2002 | Benedetti | B21B 1/18 148/653 |

FOREIGN PATENT DOCUMENTS

| | | |
|---|---|---|
| JP | 60-29421 | 2/1985 |
| JP | 62-246282 | 10/1987 |
| JP | 2006-233303 | 9/2006 |
| WO | 2011/152447 | 12/2011 |

\* cited by examiner

PRODUCTION METHOD AND PRODUCTION FACILITY OF METAL PIPE

TECHNICAL FIELD

The present invention relates to a production method and production facility of a metal pipe.

BACKGROUND ART

Metal pipes typified by steel pipes are produced by hot working such as piercing-rolling and hot extrusion, and as needed, cold working such as cold drawing is carried out. The metal pipes are further subjected to heat treatment typified by quenching etc., to obtain desired mechanical properties (strength and toughness, etc.).

One method for heat treating a metal pipe is quenching by induction heating. Induction heating is carried out by using an induction heating coil. The metal pipe is heated while being passed through the induction heating coil. The heated metal pipe is cooled by water cooling etc. to be quenched.

In quenching, it is preferable to heat the entire metal pipe as uniformly as possible. However, in the case of quenching by induction heating, the pipe end portions of the metal pipe in particular are not likely to be uniformly heated. In the case of induction heating, unlike a batch processing by a batch furnace, the metal pipe is heated while it passes through in an induction heating coil. Therefore, the pipe end portions of the metal pipe are not likely to be heated equally with the portions of the metal pipe other than the pipe end portions, and may result in underheating or overheating. In such a case, an objective micro-structure cannot be obtained in the pipe end portions. Moreover, if a coolant such as water and oil enters onto the internal surface of the pipe from a pipe end during cooling after induction heating, the objective micro-structure may not be obtained in the pipe end portions.

In the quenching method by induction heating disclosed in JP2006-233303A and JP60-29421A, a plug or jig (hereafter, referred to as a plug etc.) is disposed between steel pipes arranged fore and aft in a line so that fore and aft steel pipes are connected with the plug etc. Thus, continuous heat treatment is carried out by induction heating on the mutually connected steel pipes. As a result of this, firing unevenness of the pipe end portions is suppressed, and further, the entry of the coolant onto the internal surface of the pipe is inhibited by the plug etc.

In the quenching method disclosed in JP62-246282A, a preceding steel material and a succeeding steel material are subjected to induction heating while they are conveyed with the spacing between them being kept at a predetermined distance. In this case, the front end portion of the succeeding steel material is preheated by the radiant heat from the rear end portion of the preceding steel material. As a result, underheating of the pipe end portions is suppressed, and the length of unquenched portion in a pipe end portion is reduced.

However, in the quenching method disclosed in JP2006-233303A and JP60-29421A, the plug etc. needs to be connected to pipe end portions. Therefore, it is difficult to increase productivity. Moreover, when the metal pipe is bent globally or partly, or the pipe end face of the pipe has unevenness, it is difficult to connect a plug etc. to a pipe end portion. Since, as described above, the metal pipe is produced by hot working, cold working, and the like, the metal pipe may be bent globally or partly during the production process. Moreover, the pipe end face after production may not be flat, and may have unevenness. In such a case, quenching defects such as firing unevenness are likely to occur in a pipe end portion.

In the quenching method disclosed in JP62-246282A as well, if the metal pipe is bent globally or partly, or the pipe end face of the pipe has unevenness, the radiant heat of the rear end of the preceding steel material is not likely to transfer to the front end of the succeeding steel material. Therefore, quenching defects such as firing unevenness are likely to occur at a pipe end portion.

DISCLOSURE OF THE INVENTION

It is an objective of the present invention to provide a production method of a metal pipe which can suppress quenching defects.

The production method of a metal pipe according to an embodiment of the present invention includes the steps of straightening bend of a metal pipe by a straightening machine; cutting off both pipe end portions of the metal pipe whose bend has been straightened; and conveying a plurality of the metal pipes whose both pipe end portions have been cut off, to a quenching apparatus, and quenching the metal pipes by cooling after heating by induction heating the metal pipes in the quenching apparatus.

The production method of a metal pipe according to the present embodiment can suppress quenching defects.

BEST MODE FOR CARRYING OUT THE INVENTION

The summary of the production method and production facility of a metal pipe according to the present embodiment is as follows.

The production method of a metal pipe according to the present embodiment includes the steps of: straightening bend of a metal pipe by a straightening machine; cutting off both pipe end portions of the metal pipe whose bend has been straightened; and conveying a plurality of the metal pipes whose both pipe end portions have been cut off, to a quenching apparatus, and quenching the metal pipes by cooling after heating by induction heating the metal pipes in the quenching apparatus.

In this case, the bend of the metal pipe is straightened by the straightening machine. Further, the unevenness of each pipe end face of the metal pipe is suppressed by the cutting off thereof. The both pipe end portions are cut off after the bend is straightened. Thus, even if there remains some bend at an end portion of the straightened metal pipe, this portion is cut off. As such, the metal pipe is likely to be straight. Since quenching by induction heating is performed on a metal pipe which has a straight shape and in which the unevenness of the end faces is suppressed, quenching defects such as firing unevenness are suppressed.

Preferably, the quenching apparatus includes an induction heating coil and a cooling apparatus. The induction heating coil is disposed at an entrance side of the quenching apparatus. The cooling apparatus is disposed at an exit side of the quenching apparatus, and cools the metal pipe by using a coolant. In the step of quenching, metal pipes aligned fore and aft in the quenching apparatus are conveyed with the pipe ends thereof being abutted to each other.

In this case, the pipe ends of the metal pipes are abutted to and brought into contact with each other. As a result, the metal pipes aligned fore and aft act as if they are a single long steel pipe and substantially no pipe end portion exists. Thus, the entire metal pipe is uniformly soaked. As a result, quenching defects due to underheating or overheating of the pipe end portions of the metal pipe are suppressed. Moreover, since the pipe end portions come in contact with each other, the coolant is inhibited from entering onto the pipe internal surface at the time of quenching. Thereby, quenching defects of pipe end portions are suppressed.

Preferably, a production apparatus to be used for the above described production method includes a straightening machine, a quenching apparatus, a conveyor, and a pipe cutting apparatus. The conveyor is disposed between the straightening machine and the quenching apparatus to convey the metal pipes, whose bend has been straightened, toward the quenching apparatus. The pipe cutting apparatus is disposed at the conveyor to cut off both pipe end portions of a metal pipe whose bend has been straightened. In the step of cutting, both pipe end portions of a metal pipe conveyed from the straightening machine by the conveyor are cut off by the pipe cutting apparatus, and in the step of quenching, a plurality of metal pipes whose both pipe end portions have been cut off are conveyed to the quenching apparatus by the conveyor.

In this case, the metal pipes are conveyed by the conveyor such that processes from straightening to quenching are carried out by so-called on-line processing. This will improve the productivity of the metal pipe, and be advantageous in the traceability thereof as well.

Preferably, the conveyor includes first to third conveyors. The first conveyor is disposed at the exit side of the straightening machine to convey metal pipes, whose bend has been straightened, in the axial direction of the metal pipe. The second conveyor aligns metal pipes, which have been conveyed by the first conveyor, in the radial direction of the metal pipe, and conveys the pipes in the radial direction. The third conveyor is disposed at the entrance side of the quenching apparatus to convey the metal pipes conveyed from the second conveyor, in the axial direction of the metal pipe to the quenching apparatus. The pipe cutting apparatus includes first and second cutting apparatuses. The first cutting apparatus is disposed on one end side of the metal pipe to be conveyed on the second conveyor. The second cutting apparatus is disposed on the other end side of the metal pipe to be conveyed on the second conveyor. The step of cutting includes the steps of: conveying a metal pipe to a cutting position by the first cutting apparatus; cutting off one pipe end portion of the metal pipe by the first cutting apparatus at the cutting position by the first cutting apparatus; conveying the metal pipe to a cutting position of the second cutting apparatus by the second conveyor after the cutting of the one pipe end portion; and cutting off the other pipe end portion of the metal pipe by the second cutting apparatus at the cutting position of the second cutting apparatus.

In this case, a plurality of cutting apparatuses are utilized to cut off one after another end of each metal pipe by each cutting apparatus. Therefore, it is possible to reduce the time needed for the cutting.

Preferably, in the step of cutting, when the cutting operation of one pipe end portion of a metal pipe is performed by the first cutting apparatus, the cutting operation of the other pipe end portion of another metal pipe is performed by the second cutting apparatus.

In this case, it is possible to further reduce the time needed for the cutting. Therefore, the productivity of the metal pipe is improved.

The production facility of a metal pipe according to the present embodiment includes a straightening machine, a quenching apparatus, a conveyor, and a pipe cutting apparatus. The straightening machine straightens bend of the metal pipe. The quenching apparatus includes an induction heating coil and a cooling apparatus. The induction heating coil is disposed at the entrance side of the quenching apparatus. The cooling apparatus is disposed at the exit side of the quenching apparatus to cool the metal pipe with a coolant. The quenching apparatus quenches a plurality of metal pipes which are aligned in a line and conveyed into the inside thereof. The conveyor is disposed between the straightening machine and the quenching apparatus to convey metal pipes whose bend has been straightened, toward the quenching apparatus. The pipe cutting apparatus is disposed at the conveyor to cut off the both pipe end portions of metal pipes whose bend has been straightened.

In this case, the metal pipes are conveyed by the conveyor, and straightening, cutting, and quenching are carried out by a so-called on-line processing. This will improve the productivity of the metal pipe, and is also effective in the traceability thereof.

Preferably, the conveyor includes first to third conveyors. The first conveyor is disposed at the exit side of the straightening machine to convey metal pipes whose bend has been straightened, in the axial direction of the metal pipe. The second conveyor aligns the metal pipes, which have been conveyed by the first conveyor, in the radial direction of the metal pipe, and conveys the pipes in the radial direction. The third conveyor is disposed at the entrance side of the quenching apparatus to convey the metal pipes, which have been conveyed by the second conveyor, in the axial direction of the metal pipe to the quenching apparatus. The pipe cutting apparatus includes first and second cutting apparatuses. The first cutting apparatus is disposed on one end side of the metal pipe to be conveyed on the second conveyor. The second cutting apparatus is disposed on the other end side of the metal pipe to be conveyed on the second conveyor.

In this case, a plurality of cutting apparatuses are utilized to cut off one after another end of each metal pipe by each cutting apparatus. Therefore, it is possible to reduce the time needed for the cutting.

Preferably, when the cutting operation of one pipe end portion of a metal pipe is performed by the first cutting apparatus, the cutting operation of the other pipe end portion of another metal pipe is performed by the second cutting apparatus.

In this case, it is possible to further reduce the time needed for the cutting. Therefore, the productivity of the metal pipe is improved.

Hereafter, the present embodiment will be described in detail with reference to the drawings. The like or corresponding parts in the drawings are given the like reference characters without repeating the description thereof.

[First Embodiment]
[General Configuration of Facility and Apparatus]

Figure 1:
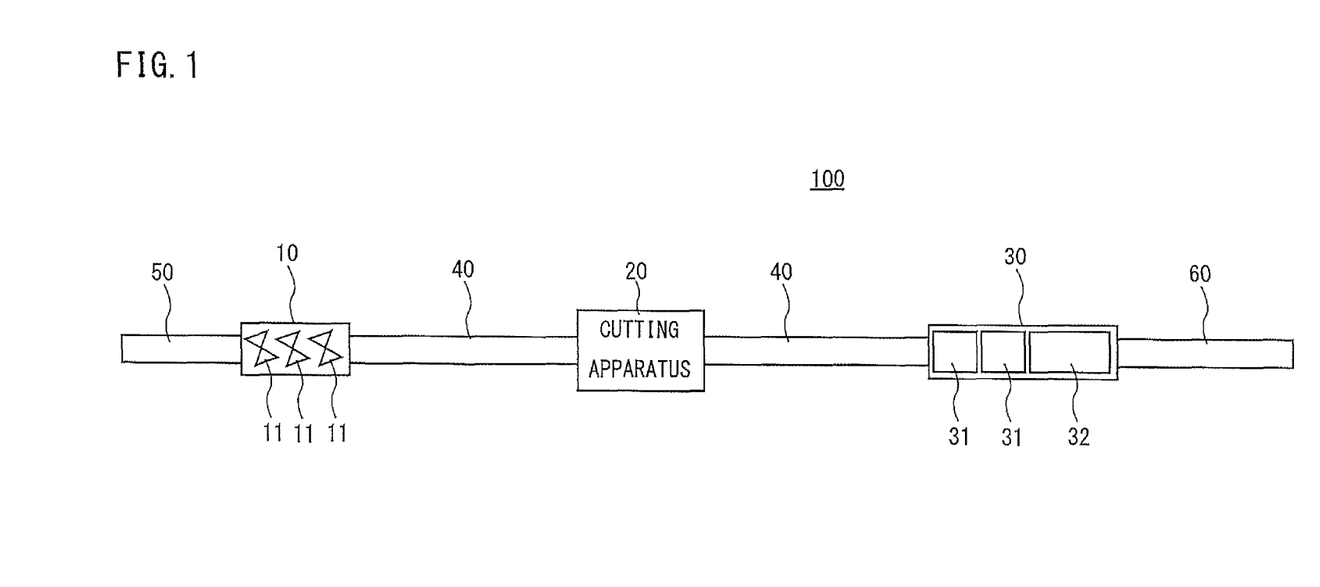
FIG. 1 is a general block diagram of a production facility of a metal pipe according to the present embodiment.

FIG. 1 is a general block diagram (layout diagram) of a production facility of a metal pipe according to the present embodiment. Referring to FIG. 1, a production facility 100 includes a straightening machine 10, a pipe cutting apparatus 20, a quenching apparatus 30, and a conveyor 40.

The straightening machine 10 straightens bend of the metal pipe. The straightening machine 10 is a roll straightening machine and includes a plurality of straightening roll pairs 11. The plurality of straightening roll pairs 11 are arranged in a line along the pass line. The straightening roll pair 11 includes a pair of straightening rolls which are disposed above and below on both sides of the pass line. The rotational axis of each straightening roll crosses with each other. The straightening machine 10 further includes a lifting apparatus not shown. The lifting apparatus adjusts the spacing between each straightening roll in the straightening roll pair 11. The lifting apparatus further adjusts the height position between adjacent straightening roll pairs 11 to set an offset.

The straightening machine 10 straightens bend of a metal pipe by passing the metal pipe through a plurality of straightening roll pairs 11.

The quenching apparatus 30 includes an induction heating coil 31 and a cooling apparatus 32. The induction heating coil 31 heats the metal pipe to a quenching temperature by induction heating. The induction heating coil 31 is disposed at the entrance side of the quenching apparatus 30. A plurality of the induction heating coils 31 are arranged in a line along the pass line. In the present example, the quenching apparatus 30 includes two induction heating coils 31. However, the induction heating coil 31 may be not less than three or may be one.

The cooling apparatus 32 cools the metal pipe which is heated to a quenching temperature, by using a coolant. The cooling apparatus 32 is disposed at the exit side of the quenching apparatus 30. The cooling apparatus 32 has a plurality of spouts arranged around the pass line. The cooling apparatus 32 sprays a coolant from the spouts thereby rapidly cooling the metal pipe. The coolant is, for example, water or oil.

The cooling apparatus 32 is not limited to the above described configuration. Other configurations may be adopted to rapidly cool the metal pipe by using a coolant.

The quenching apparatus 30 further includes a plurality of conveyor rollers. The plurality of conveyor rollers are arranged along the pass line between the plurality of induction heating coils 31 and the cooling apparatus 32. Quenching is carried out while the metal pipes are conveyed at a predetermined speed by the conveyor roller.

The conveyor 40 is disposed between the straightening machine 10 and the quenching apparatus 30 to convey metal pipes, whose bend is straightened by the straightening machine 10, to the quenching apparatus 30. In the present example, the conveyor 40 includes a plurality of conveyor rollers arranged along the pass line. However, the conveyor 40 may have other configurations other than the conveyor roller.

The pipe cutting apparatus 20 cuts off both pipe end portions of the metal pipe. The pipe cutting apparatus 20 is disposed at the conveyor 40. The pipe cutting apparatus 20 includes a plurality of clamp apparatuses to be disposed around the pass line and a disc-shaped knife-saw. The plurality of clamp apparatuses come into contact with the outer peripheral surface of the metal pipe, which is conveyed on the pass line, to hold the metal pipe therebetween. The disc-shaped knife-saw cuts off the pipe end portions (the front pipe end portion and the rear pipe end portion) of the metal pipe while moving in the circumferential direction on the outer peripheral surface of the metal pipe held between the clamp apparatuses. The pipe cutting apparatus 20 may include a plurality of disc-shaped knife-saws. In this case, the plurality of knife-saws are disposed around the axis along which the metal pipe is disposed. Each knife-saw cuts the metal pipe while moving in the circumferential direction of the metal pipe. Using a knife-saw can suppress the occurrence of "burrs" on the end face of the metal pipe.

The production facility 100 further includes conveyors 50 and 60. The conveyors 50 and 60 include a plurality of conveyor rollers arranged along the pass line. The conveyor 50 conveys metal pipes, which are object materials of quenching and are retained in a predetermined place, to the straightening machine 10. The conveyor 60 conveys the metal pipes which have been quenched to a predetermined tentative place or storage place. The conveyors 50 and 60 may convey metal pipes by other configurations other than the conveyor roller.

[Production Method of Metal Pipe]

In the production method of a metal pipe according to the present embodiment bend of a metal pipe is straightened by a straightening machine 10, both pipe end portions of the metal pipe are cut by a pipe cutting apparatus 20, and thereafter the metal pipe is quenched by a quenching apparatus 30. The bend of the metal pipe to be quenched is straightened and the pipe end faces thereof are flat without unevenness due to the cutting. Therefore, when pipe ends of a preceding material (a preceding metal pipe) and a succeeding material (the metal pipe succeeding to the preceding material) are abutted to each other, the rear end of the preceding material and the front end of the succeeding material are likely to be in surface contact with each other, and the preceding material and the succeeding material behave as if they are a single long metal pipe. Therefore, at the time of quenching, the entire metal pipe is likely to be uniformly heated thereby suppressing quenching defects such as firing unevenness. Hereafter, the production method of a metal pipe will be described in detail.

Figure 2:
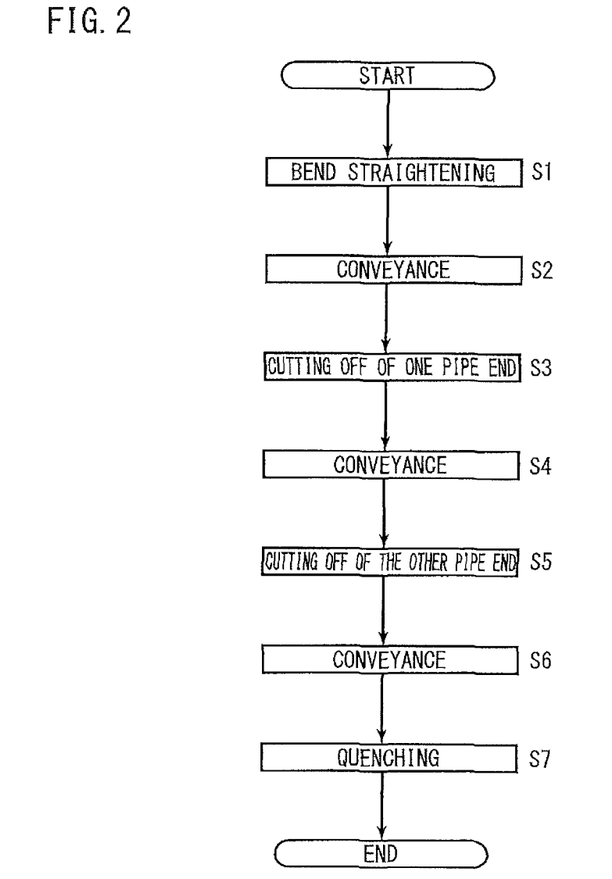
FIG. 2 is a flowchart showing a production method of a metal pipe according to the present embodiment.

FIG. 2 is a flowchart showing the production method of a metal pipe according to the present embodiment. Referring to FIGS. 1 and 2, first, bend of a metal pipe is straightened by using the straightening machine 10 (S1). To be specific, the metal pipe is conveyed in the axial direction of the metal pipe along on the pass line by the conveyor 50. The conveyed metal pipe is passed through the straightening roll pair 11 of the straightening machine 10 to straighten bend of the metal pipe.

The metal pipes whose bend has been straightened are conveyed in the axial direction of the metal pipe by the conveyor 40 (S2). The metal pipes are conveyed up to the pipe cutting apparatus 20 by the conveyor 40.

Both pipe end portions of the conveyed metal pipes are cut off by the pipe cutting apparatus 20 (S3 to S5). A plurality of position adjustment rollers are arranged at the entrance side and the exit side of the pipe cutting apparatus 20. The position adjustment rollers move the metal pipe fore and aft in the axial direction to adjust the positional relationship between the front end portion of the metal pipe and the knife-saw of the pipe cutting apparatus 20. When the front pipe end portion of the metal pipe has moved to a predetermined position, the position adjustment rollers are stopped. Then, the clamp apparatuses of the pipe cutting apparatus 20 hold the metal pipe therebetween. The metal pipe is fixed by the clamp apparatuses. After the metal pipe is held by the clamp apparatuses, the front pipe end portion of the metal pipe is cut off while the knife-saw is turned (S3).

After the front pipe end portion of the metal pipe is cut off, the holding by the clamp apparatus is released and the metal pipe is made to advance in the axial direction by the position adjustment roller (S4). Then, the positional relationship between the rear pipe end portion of the metal pipe and the knife-saw is adjusted. When the rear pipe end portion of the metal pipe has moved to a predetermined position, the adjustment rollers are stopped. The metal pipe is held between the clamp apparatuses and fixed again. Then, the rear pipe end portion of the metal pipe is cut off while the knife-saw is rotated (S5). The end faces of the front pipe end portion and the rear pipe end portion of the metal pipe after cutting are flat, and the unevenness thereof is suppressed.

As described above, the cutting off of the pipe end portions at steps S3 and S5 occurs after the bend is straightened (S1). Thus, even if there remains some bend at an end portion of the straightened metal pipe, this end portion with some remaining bend is likely be cut off. As such, the metal pipe is likely to be straight.

By the above described straightening step (S1) and the cutting step (S3 and S5), the metal pipe becomes straight and the both end faces become flat.

The metal pipe whose both pipe end portions are cut off is conveyed up to the quenching apparatus 30 by using the conveyor 40 (S6). At this moment, the conveyor 40 conveys the metal pipe in the axial direction of the metal pipe.

After the metal pipe has arrived at the quenching apparatus 30, the metal pipe is quenched (S7). At this moment, a plurality of metal pipes, which are aligned fore and aft in a line, are conveyed into the quenching apparatus 30 with the pipe ends of the metal pipes being abutted to each other. Then, heating by the induction heating coil 31 and rapid cooling by the cooling apparatus 32 are performed.

A plurality of adjustment rollers are arranged along the pass line on the side of the quenching apparatus 30 of the conveyor 40. The plurality of adjustment rollers cause a succeeding metal pipe (succeeding material) to catch up and be abutted to a preceding metal pipe (preceding material). The adjustment rollers include a high-speed roller and a low-speed roller. The low-speed roller is arranged closer to the quenching apparatus 30 than the high-speed roller is. The low-speed roller includes a driving source different from that of the high-speed roller, and the conveying speed of the low-speed roller is lower than the conveying speed of the high-speed roller.

The plurality of metal pipes, which are arranged in a line in the axial direction of the metal pipe, are conveyed from the high-speed roller to the low-speed roller. At this moment, since the conveying speed of the low-speed roller is lower than that of the high-speed roller, the rear pipe end of a preceding material is abutted to and brought into contact with the front pipe end of a succeeding material. As a result of this, the plurality of metal pipes aligned fore and aft are passed through the induction heating coil 31 in a state as if they are a single long metal pipe. Therefore, underheating and overheating of pipe end portions of the metal pipe can be suppressed, thereby suppressing non-uniform heating of the metal pipe.

It is noted that although the plurality of adjustment rollers are disposed on the side of the quenching apparatus 30 in the conveyor 40 in the above described example, the plurality of adjustment rollers may be disposed in the quenching apparatus 30. The speed control of each adjustment roller for making the succeeding material to catch up the preceding material may be performed by using a known method.

The plurality of metal pipes, which are abutted to each other, are further passed through the cooling apparatus 32 to be rapidly cooled and quenched. At this moment, since the plurality of metal pipes remain to be abutted to each other, it is less likely that the coolant enters onto the pipe internal surface from a pipe end of the metal pipe. Therefore, it is possible to suppress that the pipe internal surface is excessively cooled by the coolant, making it difficult to obtain an objective micro-structure.

The quenched metal pipes are conveyed to a predetermined tentative place or a storage place by the conveyor 60.

As so far described, the production method of a metal pipe according to the present embodiment can feed metal pipes, which each has a straight shape and whose pipe end faces are flat, to the quenching apparatus 30 by the straightening machine 10 and the pipe cutting apparatus 20. Thereby, the metal pipes are likely to be uniformly heated in the quenching apparatus 30, and quenching defects due to firing unevenness etc. are suppressed.

Further, the production facility 100 links the straightening machine 10, the pipe cutting apparatus 20, and the quenching apparatus 30 by means of the conveyor 40. Therefore, the bend straightening step (S1), the pipe cutting step (S3, S5), and the quenching step (S7) can be carried out on-line, thereby improving the productivity. Further, when the bend straightening step, the pipe cutting step, and the quenching step are carried out on-line, there will be no change in the order of metal pipes being processed in each step of the production process of the metal pipe and in the conveyance between each step. This is advantageous in the traceability of the product as well.

The layout of the production facility 100 will not be limited to that of FIG. 1. For example, the production facility 100 may have the layout shown in FIG. 3.

Figure 3:
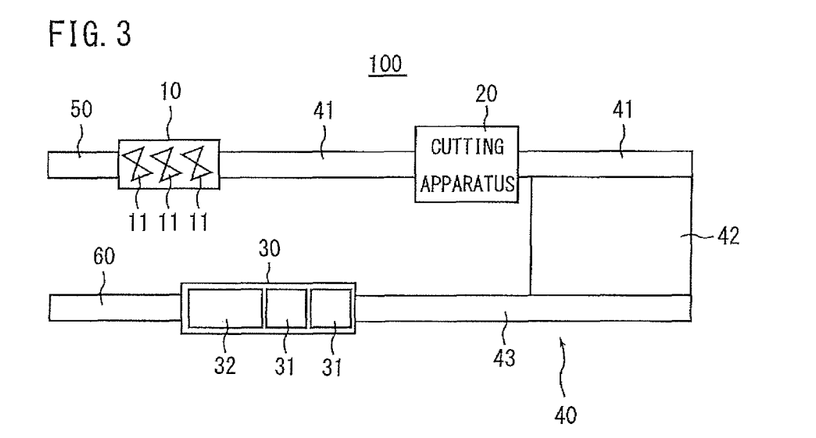
FIG. 3 is a general block diagram of a production facility of another configuration different from that of FIG. 1.

The conveyor 40 of the production facility 100 shown in FIG. 3 includes conveyors 41 to 43. The conveyor 41 causes the metal pipes, which have been straightened by the straightening machine 10, to advance in the axial direction of the metal pipe, thereby conveying them to the pipe cutting apparatus 20.

The conveyor 42 aligns the metal pipes, which have been conveyed to the exit side of the pipe cutting apparatus 20, in the radial direction of the metal pipe (the direction perpendicular to the axial direction of the metal pipe) and conveys the metal pipes in the radial direction. The conveyor 42 includes, for example, a kicker and a plurality of inclined skids. The kicker kicks out the metal pipe on the conveyor 41 at the exit side of the pipe cutting apparatus 20 onto the conveyor 42. The plurality of inclined skids extends in the direction perpendicular to the extending direction of the conveyor 41. The inclined skid is downwardly inclined from the conveyor 41 side toward the conveyor 43 side. Thereby, the metal pipe rolls down on the inclined skid from the conveyor 41 side toward the conveyor 43 side.

A raisable and retractable stopper is provided at each predetermined position in the extending direction in the inclined skid. When the stopper is raised, the metal pipe is stopped by the stopper at a predetermined place in the conveyor 42. When the stopper is brought down, the metal pipe moves to the conveyor 43 side while rolling down on the inclined skid again.

The conveyor 43 is disposed on the opposite side of the conveyor 41 across the conveyor 42. In the present example, the conveyor 43 is disposed in parallel with the conveyor 41. The conveyor 43 conveys the metal pipe in the direction which is the axial direction of the metal pipe and is the opposite direction to that of the conveyor 41. The conveyed metal pipes arrive at the quenching apparatus 30 to be quenched. In the present example, although the conveyor 43 conveys the metal pipes in the opposite direction to that of the conveyor 41, the conveyor 41 and the quenching apparatus 30 may be laid out such that the conveyor 43 conveys the metal pipes in the same direction as that of the conveyor 41.

Using the production facility 100 of FIG. 3 also enables to carry out the production flow of a metal pipe shown in FIG. 2. In short, if the bend straightening step (S1), the pipe cutting step (S3 and S5), and the quenching step (S7) can be carried out on-line in this order, the layout of the production facility 100 (particularly the configuration and disposition of the conveyor 40) will not be particularly restricted.

[Second Embodiment]

In the first embodiment, the both pipe end portions of the metal pipe are cut by one pipe cutting apparatus 20. However, a plurality of cutting apparatuses may be provided so that the cutting of the front pipe end portion and the rear pipe end portion of each metal pipe is performed by separate cutting apparatuses.

Figure 4:
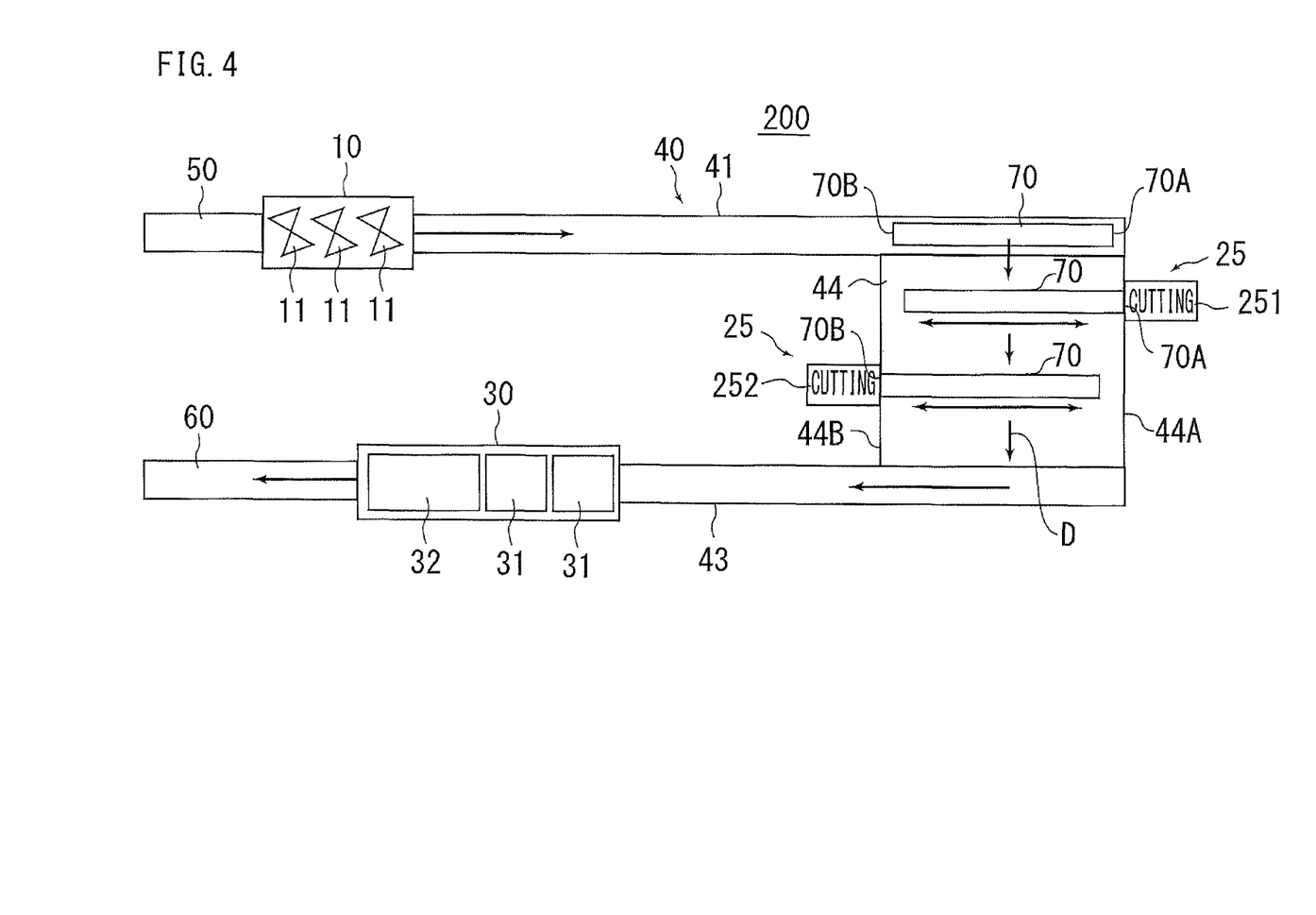
FIG. 4 is a general block diagram of a production facility of another configuration different from those of FIGS. 1 and 3.

FIG. 4 shows general configurations of a production facility 200 according to the second embodiment. Referring to FIG. 4, the production facility 200 includes a pipe cutting apparatus 25 in place of the pipe cutting apparatus 20 in comparison with the production facility 100 shown in FIG. 3. The production facility 200 further includes a conveyor 44 in place of the conveyor 42 in comparison with the production facility 100 shown in FIG. 3. The other configurations of the production facility 200 are the same as those of the production facility 100 shown in FIG. 3.

The pipe cutting apparatus 25 is not disposed at the conveyor 41 but at the conveyor 44. The pipe cutting apparatus 25 includes cutting apparatuses 251 and 252.

The cutting apparatus 251 is disposed on one side edge 44A of the two side edges 44A and 44B of the conveyor 44. The cutting apparatus 252 is disposed on the opposite side in which the cutting apparatus 251 is disposed, that is, on the side edge 44B. The cutting apparatuses 251 and 252 are disposed to be offset from each other in the conveying direction D of the conveyor 44. The cutting apparatuses 251 and 252 each include a clamp apparatus and a disc-shaped knife-saw as the pipe cutting apparatus 20 does.

The cutting apparatus 251 cuts off one pipe end portion 70A of the pipe end portions 70A and 70B of a metal pipe 70 which is conveyed in the radial direction by the conveyor 44. The cutting apparatus 252 cuts off the other pipe end portion 70B of another metal pipe 70. In short, the two cutting apparatuses 251 and 252 cut off mutually different pipe end portions 70A and 70B. Thereby, it is possible to reduce the time required for the cutting step of the pipe end portions 70A and 70B of the metal pipe 70. Therefore, when the cutting step of the pipe end portions 70A and 70B determines the rate of the production process, it is possible to improve the productivity thereof.

The conveyor 44 includes the same configurations as those of the conveyor 42. The conveyor 44 further includes a position adjustment roller. The position adjustment roller is disposed in accordance with the layout positions of the cutting apparatus 251 and the cutting apparatus 252.

The position adjustment rollers are disposed in the axial direction of the metal pipe 70 at a position corresponding to the entrance side of the cutting apparatus 251 (hereafter, referred to as an entrance side position) in the conveyor 44. The position adjustment rollers cause the metal pipes 70, which have been conveyed to the entrance side position of the cutting apparatus 251, to advance or retreat in the axial direction, thereby adjusting the positional relationship between the pipe end portion 70A and the disc-shaped knife-saw in the cutting apparatus 251, to dispose the pipe end portion 70A at a cutting position.

The position adjustment rollers are also arranged on the entrance side of the cutting apparatus 252, and convey the pipe end portion 70B to a cutting position.

The production method of a metal pipe using the production facility 200 having the above described configurations can be explained by means of the same production flow as that in FIG. 2.

Referring to FIGS. 2 and 4, a metal pipe 70 which has been straightened by the straightening machine 10 (S1) is conveyed by the conveyor 41 (S2). Then, the metal pipe 70 which has been conveyed up to the rear end portion of the conveyor 41 is moved to the conveyor 44 by a kicker etc. (S2). The metal pipe 70 is aligned in the radial direction and conveyed in the radial direction by the conveyor 44.

For example, a raisable and retractable stopper is disposed at the entrance side position of the cutting apparatus 251. The metal pipe 70 is stopped at the entrance side position of the cutting apparatus 251 by the stopper.

The conveyor 44 causes the metal pipe 70, which has been disposed at the entrance side position, to advance or retreat in the axial direction by the position adjustment roller, and conveys the pipe end portion 70A to a cutting position. After the pipe end portion 70A is disposed at a cutting position, the pipe end portion 70A is cut off by the cutting apparatus 251 (S3).

The conveyor 44 further coveys the metal pipe 70 whose pipe end portion 70A has been cut off to the entrance side position of the cutting apparatus 252 (S4). For example, a kicker is provided at the entrance side position of the cutting apparatus 251. The stopper disposed at the entrance side position of the cutting apparatus 251 is brought down, and the metal pipe 70 is kicked out to the conveyor 43 side by the kicker. The metal pipe 70 again moves to the conveyor 43 side while rolling down on the inclined skid.

A raisable and retractable stopper is provided at the entrance side position of the cutting apparatus 252, and the metal pipe 70 is stopped by the stopper at the entrance side position of the cutting apparatus 252.

The pipe end portion 70B is conveyed to a cutting position by the position adjustment roller arranged at the entrance side position of the cutting apparatus 252. Thereafter, the pipe end portion 70B is cut off by the cutting apparatus 252 (S5).

Preferably, when the cutting operation of the pipe end portion 70B of the metal pipe 70 is carried out by the cutting apparatus 252, the cutting operation of the pipe end portion 70A of another metal pipe which is different from the metal pipe 70 to be cut at the cutting apparatus 252 is carried out by the cutting apparatus 251. That is, when the metal pipe 70 is cut by the cutting apparatus 252, the metal pipe 70 which is arranged in the rear of the metal pipe 70 to be cut by the cutting apparatus 252 is cut by the cutting apparatus 251.

In this case, the cutting operations of a plurality of metal pipes 70 are carried out in parallel by a plurality of cutting apparatuses 251 and 252. Since the cutting step of pipe end portions takes time, it is likely to determine the rate of the production process of the metal pipe. Therefore, conducting parallel processing by using a plurality of cutting apparatuses 251 and 252 allows further reduction of the cutting step of the pipe end portions 70A and 70B thereby improving the productivity of the metal pipe.

The metal pipe 70 whose pipe end portion 70B has been cut off is conveyed from the conveyor 44 to the conveyor 43.

The conveyor 44 conveys the metal pipe 70 in the axial direction toward the quenching apparatus 30 (S6). Then, the metal pipes 70 which are arranged fore and aft are brought into abutment with each other, and are quenched (S7).

As so far described, in the production method of a metal pipe using the production facility 200, since a plurality of cutting apparatuses 251 and 252 are utilized, it is possible to reduce the processing time of the cutting step of the pipe end portions, thereby improving the productivity.

In the above described first and second embodiments, metal pipes which are arranged fore and aft in the axial direction are brought into abutment with each other, and are quenched during the quenching step. However, during quenching, the metal pipes located fore and aft may not be brought into abutment with each other. Even in such a case, owing to the bend straightening and the pipe end cutting, it is possible to quench metal pipes whose pipe end face is flat and which has a straight shape. Thereby, quenching defects typified by firing unevenness can be suppressed to a certain degree.

The above described conveyors 42 and 44 will not be particularly limited in configuration, provided they can convey the metal pipe in the radial direction. For example, the conveyors 42 and 44 may include a chain conveyor which can convey the metal pipe 70 in the radial direction, or a walking beam, in place of the inclined skid. Moreover, the metal pipe 70 may be conveyed in the radial direction by other well-known conveyor mechanisms. Further, the production facilities 100 and 200 may include different apparatuses other than the above described apparatuses.

The above described pipe cutting apparatuses 20 and 25 include a clamp apparatus and a disc-shaped knife-saw. However, the configuration of the pipe cutting apparatuses 20 and 25 will not be particularly limited provided that the pipe end portions of a metal pipe can be cut off so as to have a flat section. Examples of the pipe cutting apparatus include chip-saws, pipe cutting apparatuses by means of a grinder, and the like. However, when such pipe cutting apparatuses are utilized, so-called "burrs" are generated on the cutting plane. Therefore, when using such pipe cutting apparatuses, it is preferable to further provide a chamfering machine.

Although embodiments of the present invention have been described so far, the above described embodiments are merely exemplification for carrying out the present invention. Therefore, the present invention will not be limited to the above described embodiments, and can be carried out by appropriately modifying the above described embodiments within a range not departing from the spirit of the invention.

The invention claimed is:

1. A method of producing a metal pipe, comprising the steps of:
   straightening a bend of a metal pipe by a straightening machine;
   cutting off both pipe end portions of the metal pipe whose bend has been straightened;
   conveying a plurality of the metal pipes whose both pipe end portions have been cut off, to a quenching apparatus; and
   quenching the metal pipes in the quenching apparatus by induction heating the metal pipes followed by cooling the induction heated metal pipes.

2. The method of producing according to claim 1, wherein the quenching apparatus comprises:
   an induction heating coil disposed at an entrance side of the quenching apparatus; and
   a cooling apparatus cooling the metal pipe by using a coolant, the cooling apparatus being disposed at an exit side of the quenching apparatus, wherein
   in the step of quenching, metal pipes aligned fore and aft are conveyed with pipe ends thereof being abutted to each other in the quenching apparatus.

3. The method of producing according to claim 1, wherein a production facility used for the method of producing comprises:
   the straightening machine;
   the quenching apparatus;
   a conveyor conveying the metal pipe whose bend has been straightened toward the quenching apparatus, the conveyor being disposed between the straightening machine and an entrance side of the quenching apparatus; and
   a pipe cutting apparatus cutting off both pipe end portions of the metal pipe whose bend has been straightened, the pipe cutting apparatus being disposed at the conveyor, wherein
   the both pipe end portions of the metal pipe which has been conveyed from the straightening machine by the conveyor are cut off by the pipe cutting apparatus in the cutting step, and
   the plurality of the metal pipes whose both pipe end portions have been cut off are conveyed to the quenching apparatus by the conveyor in the quenching step.

4. The method of producing according to claim 3, wherein the conveyor comprises:
   a first conveyor conveying the metal pipe whose bend has been straightened in the axial direction of the metal pipe, the first conveyor being disposed at the exit side of the straightening machine;
   a second conveyor aligning the metal pipe, which has been conveyed by the first conveyor, in a radial direction of the metal pipe and conveying the metal pipe in the radial direction; and
   a third conveyor conveying the metal pipe, which has been conveyed by the second conveyor, in the axial direction of the metal pipe to the quenching apparatus, the third conveyor being disposed at the entrance side of the quenching apparatus, wherein
   the pipe cutting apparatus comprises:
   a first cutting apparatus disposed on one end side of the metal pipe which is conveyed by the second conveyor; and
   a second cutting apparatus disposed on the other end side of the metal pipe which is conveyed by the second conveyor, and
   the cutting step comprises the steps of:
   conveying the metal pipe to a cutting position of the first cutting apparatus at the second conveyor;
   cutting one pipe end portion of the metal pipe by the first cutting apparatus at the cutting position of the first cutting apparatus;
   conveying the metal pipe to a cutting position of the second cutting apparatus at the second conveyor after cutting the one pipe end portion; and
   cutting the other pipe end portion of the metal pipe by the second cutting apparatus at the cutting position of the second cutting apparatus.

5. The method of producing according to claim 4, wherein in the cutting step,
   when a cutting operation of one pipe end portion of the metal pipe is performed by the first cutting apparatus, a cutting operation of the other pipe end portion of another metal pipe is performed by the second cutting apparatus.

6. A production facility of a metal pipe, comprising:

a straightening machine straightening a bend of a metal pipe;

a quenching apparatus quenching a plurality of the metal pipes which are aligned in a line and conveyed into the inside thereof, the quenching apparatus comprising an induction heating coil disposed at an entrance side of the quenching apparatus and a cooling apparatus disposed at an exit side of the quenching apparatus;

a conveyor conveying the metal pipe, whose bend has been straightened, toward the quenching apparatus, the conveyor being disposed between the straightening machine and an entrance side of the quenching apparatus; and a cutting apparatus cutting both pipe end portions of the metal pipe whose bend has been straightened, the cutting apparatus being disposed at the conveyor.

7. The production facility according to claim 6, wherein the conveyor comprises:

a first conveyor conveying the metal pipe, whose bend has been straightened, in the axial direction of the metal pipe, the first conveyor being disposed at the exit side of the straightening machine;

a second conveyor aligning the metal pipe, which has been conveyed by the first conveyor, in a radial direction of the metal pipe and conveying the metal pipe in the radial direction; and a third conveyor conveying the metal pipe, which has been conveyed by the second conveyor, in the axial direction of the metal pipe to the quenching apparatus, the third conveyor being disposed at the entrance side of the quenching apparatus, wherein the pipe cutting apparatus comprises:

a first cutting apparatus disposed on one end side of the metal pipe which is conveyed by the second conveyor; and a second cutting apparatus disposed on the other end side of the metal pipe which is conveyed by the second conveyor.

8. The production facility according to claim 7, wherein when a cutting operation of one pipe end portion of the metal pipe is performed by the first cutting apparatus, a cutting operation of the other pipe end portion of another metal pipe is performed by the second cutting apparatus.

* * * * *